T. D. FINIZIO.
ELECTRIC HEATING APPARATUS.
APPLICATION FILED JULY 15, 1920.
1,417,154. Patented May 23, 1922.
2 SHEETS—SHEET 1.
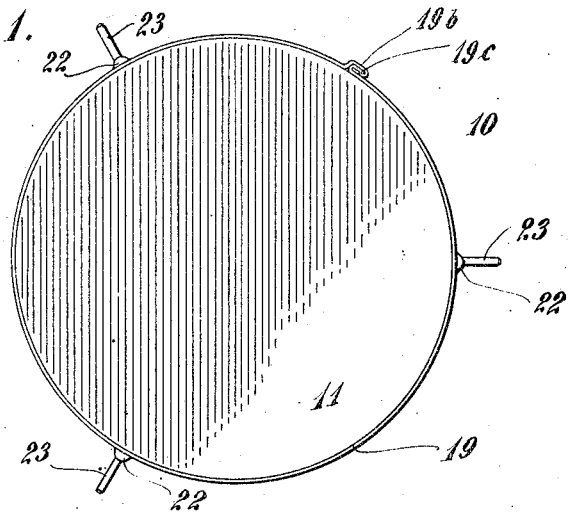
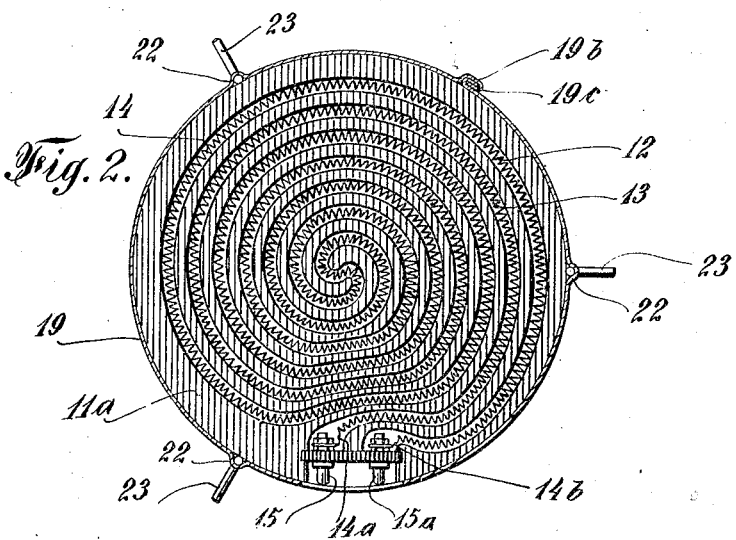
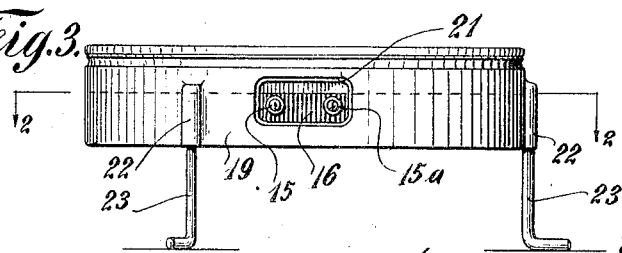
Inventor
Thomas D. Finizio
By Conrad A. Dieterich
his Attorney

T. D. FINIZIO
ELECTRIC HEATING APPARATUS.
APPLICATION FILED JULY 15, 1920.

1,417,154.

Patented May 23, 1922.
2 SHEETS—SHEET 2.

Inventor
Thomas D. Finizio
By Conrad A. Dieterich
his Attorney

UNITED STATES PATENT OFFICE.

THOMAS D. FINIZIO, OF KITCHAWAN, NEW YORK, ASSIGNOR TO STEATITE ELECTRIC PRODUCTS CORPORATION, A CORPORATION OF NEW YORK.

ELECTRIC HEATING APPARATUS.

1,417,154. Specification of Letters Patent. Patented May 23, 1922.

Application filed July 15, 1920. Serial No. 396,469.

*To all whom it may concern:*

Be it known that I, THOMAS D. FINIZIO, a citizen of the United States, residing at Kitchawan, Westchester County, in the State of New York, have invented certain new and useful Improvements in Electric Heating Apparatus, of which the following is a full, clear, and exact specification.

My invention relates to electric heating apparatus and the same has for its object, more particularly to provide a simple, efficient and reliable electric heater which may be used either separately, or as a part of a heating apparatus or stove.

Further, said invention has for its object to provide an electric heating element constituting a unitary structure which may be readily inserted into or removed from an apparatus in connection with which it may be used.

Further, said invention has for its object to provide a heating element comprising a plurality of members which are secured together and enclose an electric heat emitting element adapted to be connected with a source of electric energy.

Further, said invention has for its object to provide a heating element composed of a plurality of members, preferably made of soapstone, having an electric resistance element embedded in or arranged between the same, and united by a securing member which serves to protect the peripheral edges of said soapstone members.

Other objects will in part be obvious, and in part be pointed out hereinafter.

To the attainment of the aforesaid objects and ends my invention consists in the novel details of construction, and in the combination, connection and arrangement of parts hereinafter more fully described and then pointed out in the claims.

In the accompanying drawings forming part of this specification wherein like numerals of reference indicate like parts, Figure 1 is a face view showing one form of heating apparatus constructed according to, embodying my said invention;

Fig. 2, is a horizontal section taken on the line 2—2 of Fig. 3;

Fig. 3, is an edge view;

Figure 4:
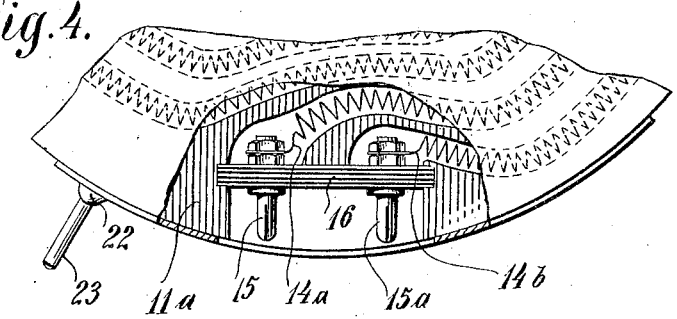
Fig. 4, is an enlarged detail face view showing the construction and arrangement of the contact terminals and the support therefor.
Figure 5:
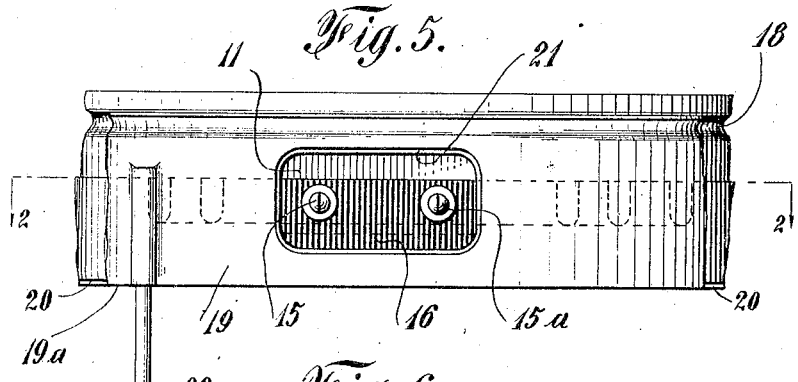
Fig. 5, is an edge view of Fig. 4, and Fig. 6, is a face view, partly broken away and in section, showing a modified form of resistance element.

In said drawings 10 designates an electric heater comprising a pair of conforming circular members constituting a face plate 11, and a lower plate $11^a$ preferably made of soapstone or other suitable insulating material capable of absorbing and emitting heat. The lower or base plate $11^a$ is preferably provided with a pair of parallel spiral recesses 12, 13 in which is disposed a coiled resistance element 14 having its ends $14^a$, $14^b$ terminating closely together and severally secured to the inner ends of contact terminals 15, $15^a$ which are embedded or otherwise suitably secured to a block 16 located in a recess in the base plate $11^a$, and preferably made of a suitable insulating material forming a more solid and less frangible support for said terminals 15, $15^a$, than the material of which said plates are formed.

The space between the walls of the recess 12, 13 and the resistance element 14 may be filled with a suitable cement.

In order to hold the base plate $11^a$, and the cover plate 11 rigidly together the vertical edge of said cover plate 11 is provided with an annular recess or groove 18 into which is pressed the upper portion of an annular metal band 19 whose lower edge $19^a$ is turned inwardly and over against the under side of the base plate 11, which plate is partly cut away at 20 in order to accommodate the in-turned lower edge of said annular band 19. The opposite ends $19^b$ $19^c$ of the band 19 are then drawn together and folded one upon the other in order to secure the same together.

In order to prevent any short-circuiting of the electric current at the terminals 15, $15^a$ the metal band 19 is provided with a cut-out portion 21 adjacent to said terminals.

In order to support the heater 10 as a whole in an elevated position the band 19 may be provided with a plurality of struck-up socket portions 22, adapted to receive the upper ends of legs or supports 23.

Figure 6:
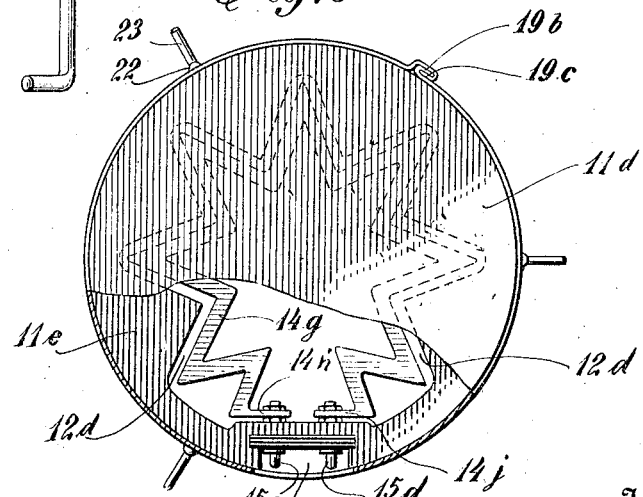

In the modification illustrated at Fig. 6 the apparatus is constructed essentially as herein above described except that the resistance element $14^x$ is struck or stamped out of sheet metal, possessing the requisite resistance qualities, and is here shown as being flat and of zig-zag form. The element 14$^g$ is located in a conforming recess 12$^d$ provided in the base plate 11$^e$, and has its ends 14$^h$, 14$^j$, secured to contact terminals 15$^c$, 15$^d$, secured in a recessed portion 17$^a$ of the base plate 11$^d$.

The cover plate 11$^d$ and base plate 11$^e$ are secured together by a metal band 19$^c$, as hereinabove described.

The operation of the apparatus is obvious. It is to be noted particularly that the constructions shown and described are each complete units which may be inserted into or used in connection with any apparatus by merely connecting the contact terminals thereof with a source of electric supply; and that as said terminals are fully protected in each construction by being arranged wholly within the outlines of the plates, all danger of injuring or breaking the connection thereof with the ends of the resistance element is eliminated:

Having thus described my said invention what I claim and desire to secure by Letters Patent is:—

1. An electric heater comprising a pair of plates, a resistance element embedded in one of said plates and protected by the other thereof, and a member secured to one of said plates and engaging the other thereof to hold the same secured together, substantially as specified.

2. An electric heater comprising a pair of conforming plates, a resistance element disposed intermediate the same, terminals on said plates connected to the ends of said resistance element, and a member secured to one of said plates and embracing the edge of the other thereof whereby to hold said plates secured together, substantially as specified.

3. An electric heater comprising a pair of conforming plates, a resistance element disposed intermediate the same, terminals on said plates connected to the ends of said resistance element, means engaging the edges of said plates for securing the same together, and supports adapted to engage with said securing means for supporting said heater in elevated position, substantially as specified.

4. An electric heater comprising a pair of conforming plates, a resistance element disposed intermediate the same, terminals on said plates connected to the ends of said resistance element, a securing member engaging the edges of said plates, and supporting members detachably secured to said securing member, substantially as specified.

5. An electric heater comprising a pair of conforming plates, a resistance element disposed intermediate the same, terminals on said plates connected to the ends of said resistance element, an endless member embracing the edges of said plates and provided with sockets, and legs adapted to be engaged by said sockets for supporting said heater in elevated position, substantially as specified.

6. An electric heater comprising a pair of conforming plates, a resistance element embedded in one of said plates, said plate having a recess therein, a support secured in said recess, contact terminals secured in said support and connected to the ends of said resistance element, and means for securing said plates together, substantially as specified.

7. An electric heater comprising a pair of conforming plates; one of said plates having recesses therein, a resistance element disposed in one of said recesses, a block disposed in the other of said recesses, a pair of contact terminals secured in said block and connected to the ends of said resistance element, and an annular member engaging the edges of said plates whereby to secure the same together;—said annular member having an opening therein to afford access to said contact terminals, substantially as specified.

8. An electric heater comprising a base plate having a plurality of recesses therein, a cover plate for said base plate conforming in outline thereto and having an annular groove in its edge, a resistance element disposed within one of the recesses in said base plate, a supporting block disposed within the other recess in said base plate, a pair of contact terminals secured in said supporting block and connected to the ends of said resistance element, and an annular member having a portion pressed into engagement with the annular groove in said cover plate, and another portion embracing the underside of said base plate; said annular member having an opening therein to afford access to the contact terminals aforesaid, substantially as specified.

Signed at the city of New York, in the county and State of New York, this 13th day of July, one thousand nine hundred and twenty.

THOMAS D. FINIZIO.

Witnesses:
IRENE V. BANNIN,
JOSEPH G. QUINN, Jr.